United States Patent Office 2,882,263
Patented Apr. 14, 1959

2,882,263

PROCESS FOR THE POLYMERIZATION OF CERTAIN UNSATURATED HYDROCARBONS USING IRON-BASED POLYMERIZATION AGENTS

Giulio Natta, Piero Pino, and Giorgio Mazzanti, Milan, Italy, assignors to Montecatini Societa Generale per l'Industria Mineraria e Chimica, Milan, Italy, a corporation of Italy No Drawing. Application December 12, 1955
Serial No. 552,295

Claims priority, application Italy December 16, 1954

16 Claims. (Cl. 260—93.7)

This invention relates to a process for polymerizing unsaturated hydrocarbons of the formula $$CH_2=CHR$$

in which R is a saturated aliphatic, an alicyclic or an aromatic radical, alone, in mixture with one another, or in mixtures with small amounts, up to about 5%, of a monomer polymerizable therewith.

This application is a continuation-in-part of our copending applications Serial Nos. 514,097 and 514,098, both filed June 8, 1955.

Uniquely, the initial polymerization products obtained by the present method are mixtures of linear, head-to-tail amorphous polymers and linear, head-to-tail crystalline polymers, both types of polymers having no branches longer than R. The amorphous crystalline polymers can be separated from each other by solvent fractionation of the polymerizate using selected organic solvents. The crystalline polymers may comprise as high as 30% or even up to 55% of the mixture and have high molecular weights and fiber forming properties. The amorphous polymers may also have relatively high molecular weights and may exhibit rubber-like properties.

It has been proposed in the Belgian Patent No. 533,362, to polymerize ethylene to polymers of high molecular weight of the order of 300,000 up to 2,000,000 or more, by using as reaction initiators, agents obtained by reacting a catalytic heavy metal compound and a catalytic metal alkyl compound.

In the aforesaid patent application, Serial No. 514,097, the catalytic heavy metal compound consisted of a compound or a mixture of compoundts of a heavy metal selected from the sub-group of groups IV to VI of the periodic table, including thorium and uranium, i.e. compounds of the elements of titanium, zirconium, hafnium, thorium, vanadium, tantalum, niobium, chromium, molybdenum, tungsten and uranium.

We have now found that certain iron compounds can also be used as the heavy metal compound. It is advantageous to use as an iron compound for this purpose a solid compound which is readily reactable with the catalytic metal alkyl compound. This is particularly the case when using ionizable iron compound.

The use of iron campounds such, for instance, as iron salts the anions of which possess oxidizing properties, and would therefore decompose a considerable amount of the metal alkyl compound without formation of a polymerization agent, appears unsuitable. Also the use of non-ionizable compounds such as iron acetylacetonate or Fe(CO)$_5$ was found to be unprofitable.

On the other hand, particularly active polymerization agents could be attained by the reaction between a metal alkyl compound of the type described in our copending patent application Ser. No. 514,097 and a compound of trivalent iron. The exchange reaction between the Fe$^{III}$ compound and the metal alkyl compound is always accompanied by a reduction of Fe$^{III}$ to Fe$^{II}$.

The reaction of metal alkyl compounds with solid ionizable iron compounds such as anhydrous ferric chloride yield particularly satisfactory polymerization agents containing metal alkyl linkages on the surface.

We have discovered that it is possible to use the compound of bi-valent iron directly in producing the polymerization agent.

The catalytic metal alkyl compound comprises a substance or a mixture of substances selected from the group consisting of simple and complex compounds the molecules of which contain as a central atom an element from the group forming the 2nd and 3rd columns of the periodic table, i.e., beryllium, magnesium, zinc, cadmium and other elements of the 2nd group, as well as, aluminum and other elements of the 3rd group.

The valences of the aforesaid central atom are linked to the same or different alkyl radicals such as ethyl, propyl, butyl, etc. One valence of the central atom may be satisfied by halogen or by an alkoxy radical such as ethoxy, etc.

We obtained the best results when using, as the catalytic metal alkyl compound, trialkyl compounds or chlorodialkyl compounds of aluminum.

Although, as stated, the polymerization aids obtained by reacting the heavy metal compound and metal alkyl compound in a solvent inert to the polymer to be formed, such as a saturated aliphatic hydrocarbon, were found useful in the production of high polymers of ethylene, it was not apparent that those agents would be useful in the polymerization of the unsaturated hydrocarbons containing the vinyl group.

As we have explained in the aforementioned application, processes and polymerization promoters that are useful for producing polyethylene of high molecular weight are not necessarily useful for producing high molecular weight polymers of the higher homologues of ethylene, such as, for instance, propylene.

In the past, it has been found that when various promoters or catalysts useful in producing high molecular weight polyethylene have been used with the higher homologues, low polymers were obtained, usually only dimers, trimers or tetramers forming light oils, or somewhat higher polymers comprising more or less viscous lubricating oils.

The products obtained by polymerizing the higher ethylene homologues by processes known in the art generally consist of mixtures of polymeric homologues and of variously branched isomers. The higher the temperature used, the smaller the degree of polymerization. But even when the known processes are carried out at relatively low temperature the products obtained are still mainly liquids or mixtures of liquids and amorphous solids in which the liquid component is present in substantial amount.

In the past it has been considered that polymerization of olefines in which one of the hydrogen atoms of a CH$_2$-group is replaced by a CH$_3$-group, such as propylene, results in non-crystalline polymers. Thus, it has been stated in the literature ("Fibers From Synthetic Polymers," Rowland Hill, ed., Elsevier Publishing Co., 1953, p. 319) that:

"Polymers of olefines in which one of the hydrogen atoms of a CH$_2$-group is replaced by a CH$_3$-group, are usually non-crystalline, owing to stereochemical irregularity."

It was believed, further, that the low crystallinity exhibited by polyvinyl chloride for example, was due to the fact that over short distances along the polymer chain chlorine atoms are alternately in left and right hand positions. (Left hand and right hand groupings are said to occur indiscriminately.)

Furthermore, it was assumed that, since the methyl group is similar in size to the chlorine atom, it is to be expected that polymers in which hydrogen atoms and methyl groups are attached to the same carbon atom in the chain, with left and right hand groupings occurring indiscriminately, will be non-crystalline, presumably owing to the stereochemical irregularity. ("Fibers from Synthetic Polymers," supra, p. 235; Hill and Walker, Jr., of Polymer Science, vol. III, 1948, p. 609.)

It has been found, also, that even when ethylene is polymerized with the aid of the special promoters obtained by reaction of the heavy metal and metal alkyl compounds, in the ratios proposed for promoting ethylene polymerization, the presence of any substantial amount of the higher olefines inhibits polymerization of the ethylene, while the higher olefines, if they react at all, do so only at very low reaction rates and, in any case, without yielding polymers of the type with which this invention is concerned.

The slowness to polymerize exhibited by the higher olefines is not overcome by merely increasing the polymerization temperature, since when the special aids described herein are used, temperatures which promote the growth of the polymer chain, bound in the form of a metallo-organic compound, without appreciably favoring its disassociation into low molecular weight olefines must be used.

In view of the foregoing, it could not be predicted, from the work with ethylene, that the polymerization agents described would be useful for the production of high molecular weight polymers of the vinyl hydrocarbons of formula $CH_2=CHR$ as defined herein.

Surprisingly, we have now found that, in fact, it is possible to obtain high molecular weight polymers of propylene and other monomeric vinyl hydrocarbons of that type, i.e., containing more than three carbon atoms per molecule and including styrene, and to produce the polymers at commercially acceptable reaction rates and in good yields, with the aid of the aforesaid initiators if the initiator is prepared from the heavy metal compound and metal alkyl compound in appropriate molar ratios.

The present invention thus represents an extension of our earlier work by utilizing compounds of trivalent iron in the production of the polymerization agent, and using the same for the polymerization of higher olefine monomers and in particular of propylene.

Thus, satisfactory polymerization initiators are obtained by reacting a finely powdered anhydrous ferric halide such as the chloride or bromide with an alkyl aluminum compound such as, for instance, aluminum triethyl, at temperatures in the range between 50 and 100° C.

Another satisfactory polymerization agent is obtained from the reaction between an aluminum alkyl compound and a ferrous halide such as ferrous chloride.

Generally, polymer products of higher molecular weight are obtained when reacting the iron compound with a metal alkyl compound wherein all valences of the central metal atom are linked to alkyl groups having the same number of carbon atoms per radical as are contained in the monomer molecule of the unsaturated hydrocarbon to be polymerized.

In accordance with the invention, the new polymerization products are obtained by polymerizing monomeric material comprising at least one of the vinyl hydrocarbons containing three or more carbon atoms per molecule in the presence of polymerization aids obtained by reacting the heavy metal compound and metal alkyl compound in molar ratios such that the metal alkyl component is not more than ten times the heavy metal compound and is preferably less than five times the heavy metal compound, as will be seen from the examples given hereinafter.

Solvents suitable for use in preparing the polymerization catalyst and carrying out the polymerization are paraffinic hydrocarbons such as, for instance, a light gasoline (substantially free of olefinic bonds), n-heptane, iso-octane, and other substances preferably of the non-aromatic type. However, benzene has also been used.

The solvents selected should be anhydrous and preferably have boiling points lower than 150° C. and not swell the highest molecular weight polymers obtained.

The reaction between the iron compound and the metal alkyl compound to form the polymerization agent, as well as the subsequent polymerization of the unsaturated hydrocarbon monomer may be carried out in an autoclave, for instance of the oscillating stainless steel type.

The autoclave should be previously thoroughly dried and evacuated because it is of general advantage to carry out the entire process in the absence of oxygen and water.

The presence of oxygen and water should be eliminated as far as technically possible because they will consume a part of the metal alkyl component and also, in particular in the case of anhydrous iron halides, tend to hydrolyze the iron compound.

In a preferred mode of operation, the iron compound which, in the case of anhydrous iron halides is preferably enclosed in a vial, is added to the solution of a metal alkyl compound in the anhydrous inert solvent, and then caused to react with the metal alkyl compound by breaking the vial, after expending the oxygen present, for instance by flushing the reaction vessel with nitrogen or another suitable inactive gas.

The vinyl hydrocarbon or mixture containing it is preferably dried carefully and then pumped into the autoclave either in the liquid or gaseous phase, or as a mixture of both phases. Its introduction may take place either before, during or after the initiation of the reaction between the metal alkyl and the iron compound.

The polymerization of the monomer of the unsaturated hydrocarbons of the type described is to be performed specifically at temperatures between 50 and 100° C. and more specifically between 60 and 70° C. for the polymerization of propylene. At these temperatures no noteworthy decomposition of the polymerization agent takes place. The polymerization may be carried out either in the absence of any solvent, in the presence of the olefine to be polymerized, which should conveniently be at least partly in the liquid state. This will require operation under pressure not exceeding 30 atmospheres and preferably between 10 and 20 atmospheres.

Or the polymerization may be carried out in the presence of solvents which do not react with the polymerization agent or the components from which the latter is produced.

In this case the polymerization itself may be carried out with normal atmospheric pressure; however, it is more convenient to operate under increased pressure, for instance in the same range of pressure mentioned above, i.e. between 10 and 20 atmospheres, in order to maintain a high olefine concentration in the liquid phase, thereby ensuring higher reaction rates.

The upper limit for the temperature range is determined by the fact that at temperatures substantially above 100° C. one only obtains low molecular weight polymers.

During the polymerization step in the autoclave the pressure falls gradually with progressing polymerization. The vinyl hydrocarbon or mixture may be pumped in in one or several batches.

While introducing the olefine the autoclave is preferably kept in motion continuously in order to further the contact between the olefine and the surface of the polymerization agent.

The polymerization lasts for several hours up to several days, the autoclave being kept in motion until the decrease of pressure ceases. The gaseous phase above the reaction product is then vented, and the reaction product consisting of a solid mass is worked up.

The reaction product originating from the polymerization is strongly colored, owing to the presence of iron compounds; it can be easily purified by treating it with an acid in the presence of solvents and wetting agents, which assist in dissolving the iron compounds included in the polymer.

The reaction mass contains, as impurities, inorganic compounds originating from the decomposition of the catalyst as well as residual catalyst itself. The product is, therefore, treated with a suitable agent, for instance methanol, for decomposing the residual catalyst, and the product which is still soaked with the inert solvent and, say, methanol, then contains (a) Crystalline polymers;
(b) Amorphous polymers;
(c) Inert solvent;
(d) Methanol or the like; and
(e) Inorganic compounds, e.g., of Al and Fe The resulting purified product is fractionated either through extraction with solvents, such as for instance, acetone, ether and heptane or by fractionated precipitation with acetone or methanol, after having been dissolved in an aromatic solvent such as benzene or toluene.

The method of this invention may be used for polymerizing vinyl hydrocarbons of the formula given including propylene, butene-1, pentene-1, hexene-1, styrene, and so on, as well as mixtures thereof and mixtures of the vinyl hydrocarbon with small amounts of ethylene.

The initial polymerization product is, as has been stated, a mixture of polymers. It comprises, usually, a small amount of an oily low molecular fraction, an amorphous fraction of higher molecular weight, and a high molecular weight fraction, the amorphous and crystalline polymers making up the bulk, generally, of the mixture.

The products are thus mainly made up of polymers that can be classified in two types, not crystallizable, amorphous and crystalline. The mixtures can be used as such for various purposes, or the different fractions can be separated depending on their solubility in various solvents, the fractions varying in their amorphous and crystalline contents, in average molecular weights, and specific viscosity.

The molecular weight of the products was estimated from specific viscosity measurements in tetrahydronaphthalene solutions at a polymer concentration of 0.3 to 0.1 gr. per 100 cm.³ of solvent and from intrinsic viscosity measurements. Specific viscosity is the viscosity of the solution less the viscosity of the solvent, divided by the viscosity of the solvent. By "intrinsic viscosity" is meant the limit of the ratio between specific viscosity and concentration for concentrations tending to zero.

$$\lim_{C \to 0} \frac{\mu \text{ spec}}{C}$$

where C is the concentration of the solution in gms./cs.

Products having an average molecular weight above 20,000 and up to 400,000 and higher may be obtained. The products are initially, and as has been stated, mixtures of polymers.

These mixtures comprise polymers which, depending on their steric structure, and their molecular weight, have very different characteristics. The amorphous products have viscous elastic properties comprised between those of a highly viscous liquid and those of an unvulcanized, non-crystallizable elastomer, while the solid, highly crystalline products, which can be oriented by drawing, give products of fiberlike behaviour. Both types of polymers are, as shown by their infra-red spectra, linear; in the case of polypropylene, e.g., both amorphous and crystalline polymers have similar infra-red spectra which are completely different from the infra-red spectra of the known branched polypropylene in which the branches are longer than R.

The difference in the properties of the two types of polymers which we have obtained, must be attributed to a different distribution, along the main chain, of asymmetric carbon atoms having the same steric configuration.

According to Flory (Principles of Polymer Chemistry, 1953, pp. 55–56, 237–238), a vinyl polymer containing asymmetric carbon atoms, as e.g.

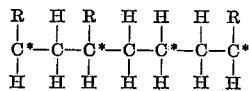

may be considered as a copolymer of two different monomer units

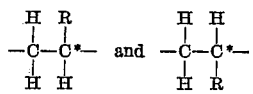

in one of which the asymmetric C atom has a $l$ configuration and in the other a $d$ configuration.

When such monomer units containing an asymmetric carbon atom showing a $l$ or $d$ configuration recur statistically along the polymer chain, as in general in all known vinyl polymers, the polymer may be considered as a copolymer of the two types of structural units, and therefore, if the substituent R is much larger than a H atom, is substantially noncrystalline and does not show any 1st order transition point.

Up to now the only known example of a vinyl polymer existing in an amorphous and in a crystalline form are the polyvinyl ethers prepared by Schildknecht and co-workers (Ind. Eng. Chem. 40 (1948), 2104; ibid. 41 (1949), 1998, 2891). The structure of the new crystalline high polymers of the alpha-olefines obtained by the present process was determined from X-rays data on drawn fibers of said polymers.

By comparing X-ray and density data, it may be seen that each stretch of principal chain included in the elementary cell corresponds to 3 monomeric units (—CH₂—CHR—), and, therefore, a regular succession of monomeric units having alternatively $d$ and $l$ asymmetric carbon atoms which could lead to a crystalline polymer on the basis of the X-ray data, the most probable is the one in which, at least for long portions of the main chain, all the asymmetric C atoms have the same steric configuration:

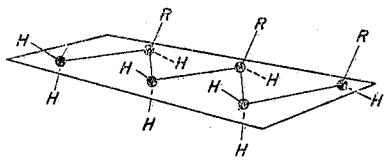

Model of a portion of the main chain of a crystalline poly-alpha-olefine according to the present invention, arbitrarily fully extended in a plane, in which the R substituents on the tertiary C atoms are all above and their H atoms below the plane of the chain.

In this case the stable existence of a planar fully extended paraffinic chain seems most unlikely, owing to the steric hindrance of the substituent groups R. In the crystalline state, the main chain must therefore assume a non-planar conformation. This conformation has been found to be spiral-like.

The hypothesis of a coiled conformation of the main chain in the crystalline state agrees with the value of the identity period along the same chain (6.5–6.7A.) which is smaller than the length of the planar, fully extended structure (7.62 A. for 3 monomeric units).

Our linear, regular head-to-tail macromolecules having substantially no branches longer than R and the main chain of which has substantially a structure of the kind illustrated in the model (isotactic structure) are recognized in the art following us as "isotactic" macromolecules, whereas our macromolecules having substantially no branches longer than R and in which the asymmetric carbon atoms of the two possible steric configurations have a substantially random distribution along the main chain are recognized in the art following us as "linear, regular head-to-tail atactic macromolecules."

The term "isotactic" was originated by one of us, G. Natta, for identifying the structure as illustrated in the model, macromolecules having substantially that kind of structure, and polymers consisting of the macromolecules having substantially that kind of structure, and is used herein for convenience and conciseness. (See, for example, the communication to the editor of the Journal American Chemical Society, by Natta et al., published in the Journal of March 20, 1955, received for publication December 10, 1954; and the article by Natta published in the Journal of Polymer Science, April 1955, vol. XIV, Issue No. 82, pp. 143–154, received for publication on February 17, 1955.)

The isotactic structure imparts to the product properties not previously known for any hydrocarbon. In fact these products with a high molecular weight are, at room temperature, crystalline solids very different, e.g., from the elastomers obtained by known methods from isobutylene, which are crystallizable under stress and show a spiral-like linear chain, but with a different identity period.

The very remarkable differences in the solubilities of the two types of polymer permit of their easy separation by extraction with suitable solvents. For a given polymeric alpha-olefine the crystalline products always show a much lower solubility than the amorphous products independently from the molecular weight, while the solubilities of polymers of the same type, but having different molecular weight, decrease slightly and gradually with an increase of the molecular weight.

When examining, e.g. the fractions obtained by fractional dissolution of the propylene polymers as described in the examples below, that portion of the product which may be extracted with ether (intrinsic viscosity 1) appears wholly amorphous under the X-rays. The further extracts in boiling n-heptane (intrinsic viscosity of extracted polypropylenes 1.2–1.3, average molecular weight probably within the range 45,000 to 55,000), appear already partially crystalline under the X-rays and melt completely at 150° C.

It was found that the polypropylene products which are insoluble in boiling n-heptane and having a higher molecular weight than those previously mentioned, probably above 100,000 (intrinsic viscosity above 3), are solids having a density between 0.90 and 0.94, and a high melting point (about 160° C.). A density of about 0.94 is the upper limit for a completely crystalline product. Said density was calculated from recticular distances determined from X-rays diffraction patterns of fibers. The specific gravity is lowered by the presence of an amorphous portion and in fact the amorphous ether-soluble polymers have a density lower than 0.90. We have found, as a general rule, that when operating under the same conditions of temperature, pressure, concentration etc. as set forth in our above mentioned application Ser. No. 514,097, crystalline polymers of an average molecular weight are obtained which is lower (e.g. 50,000 instead of 100,000), than the molecular weight of crystalline polymers produced from $Al(C_2H_5)_3$ and heavy metals of the 1st subgroup of the IV, V, and VI groups of the periodic table. On the other hand, the fraction of the non-crystallizable polymers obtained with polymerization agents produced from $Al(C_2H_5)_3$ and anhydrous iron compound, which is soluble in warm n-heptane shows an average remarkably higher molecular weight than the corresponding products obtained with the polymerization agent produced with aid of the compound of heavy metals from the first subgroup of groups IV, V and VI of the periodic table. In fact raw amorphous products have been obtained with the polymerization agent according to this invention, which show an average molecular weight of 30,000.

Above the temperature at which the crystalline state disappears, the polypropylene products do not change directly into a flowing liquid, but retain the characteristics of an amorphous plastic substance. They can, therefore, be readily processed (at a temperature somewhat higher than the temperature of complete disappearance of the crystalline structure) by the methods (moulding, injection, extrusion) known for plastic materials. It is found, moreover, that those propylene polymers of Example 1 of high molecular weight, and a high degree of crystallinity which is preserved up to relatively high temperatures (above 150° C.) show surprising mechanical charactristics, as will be further described, not previously ascertained for any known hydrocarbon so that they can be satisfactorily employed in making textile fibers.

The propylene polymers with very high molecular weight obtained by the instant method may be molded at temperatures higher than 130–150° C. to obtain plates, which are transparent when the product is well purified. Such plates may be cold stretched up to about 700%; the breaking load, referred to the section resulting after stretching, may be e.g., for the product obtained according to Example II, higher than 30 kg./sq. mm., and even considerably higher if the product is drawn into thin filaments. The stretched filaments show a silk-like appearance and their good mechanical characteristics (high breaking load and high elongation at rupture of the stretched filament) make them particularly suitable for producing textile fibers.

The following examples are given to illustrate specific embodiments of the invention, it being understood that these examples are not limitative.

*Example I*

Six stainless steel balls (1 inch diameter) are introduced together with a glass vial containing 10 g. of anhydrous ferric chloride into a 2135 ml. stainless steel autoclave. 400 ml. of anhydrous benzene are then added, the autoclave is closed and swept with nitrogen. 290 g. of pure liquid propylene are admitted at a temperature of 60° C. and a solution of 11.4 g. triethyl aluminum in 90 ml. anhydrous benzene is injected under nitrogen pressure. The autoclave is then shaken whereby the ferric chloride containing vial will be broken. The autoclave is kept in agitation for 20 hours at temperatures in the range 72° C. to 92° C. The unreacted gases are then released, and methanol is pumped into the autoclave in order to decompose the catalyst.

From the autoclave a liquid is discharged containing in suspension a gummy, solid, brown colored polymer, which is then completely coagulated with methanol and filtered for separation from the liquid phase. The solid polymer is purified from the inorganic products by treatment with hot toluene and hydrochloric acid; afterwards it is coagulated with methanol. The so obtained white, solid polymer contains 0.4% ashes and weighs 15 g. By evaporating the liquids employed in the polymerization and the purification, 21 g. of oily products are obtained. The obtained solid polypropylene was fractionated by extraction with hot solvents, using in the order: acetone, ether, n-heptane. The solid polymer did not contain portions extractable with hot acetone. 62.6% of the solid polymer could be extracted with warm ether; this fraction is a solid, with a softening point of 100° C. and a molecular weight of about 30,000. Under the X-rays it appears entirely amorphous.

The heptane extract, 36% of the solid polymer, is also solid, with a softening point of 115° C. and a molecular weight of about 50,000. About 50% of this fraction appears to consist of crystalline polypropylene.

The residue of the extractions corresponds to 1.3% of the solid polymer; it is a solid with a softening point of 160° C., which, under the X-rays appears as a crystalline polypropylene.

Example II 5.1 g. anhydrous ferrous chloride and a solution of 12 g. aluminum diethyl monochloride in 60 ml. n-heptane are introduced in a rotating autoclave filled with nitrogen and containing 12 stainless steel 1" balls, so as to function as a ball mill. After milling the materials for about 24 hours at room temperature, 250 g. propylene are added. The autoclave is kept in motion for approximately 20 hours, at temperatures between 85 and 90° C.

The reaction product is then taken out and purified as usual—23 g. of partially crystalline polymer are obtained, which is similar in composition to the polymer of Example I.

Example III 8.9 g. of anhydrous ferric bromide and a solution of 12 g. aluminum diethylmonochloride in 60 ml. n-heptane are introduced in the autoclave described in Example II. After milling for about the same time, 150 g. propylene are added and the autoclave is kept in motion for a few hours at 90° C.

From the polymerization product 12 g. of a partially crystalline polypropylene are obtained.

In the formula $CH_2=CHR$, R may contain from 1 to 16 carbon atoms, and in specifically preferred embodiments may be an alkyl, cycloalkyl or aryl radical.

It will be understood that while there have been described herein certain embodiments of our invention, it is not intended thereby to have the invention limited to the specific details given in view of the fact that it is susceptible to various modifications and changes which come within the spirit of the specification and the scope of the appended claims.

What is claimed is:

1. A process for the polymerization of unsaturated hydrocarbons of the general formula $$CH_2=CHR$$

in which R is selected from the group consisting of aliphatic radicals containing from 1 to 4 carbon atoms and the phenyl radical, alone, in admixture with one another, and in admixture with small amounts of other olefinic monomers copolymerizable therewith, to obtain linear, regular, head-to-tail polymers having substantially no branches longer than R, which process comprises contacting said unsaturated hydrocarbons under polymerization conditions with a catalyst prepared by mixing an iron halide selected from the group consisting of ferrous and ferric halides with an alkyl compound of an element selected from the group consisting of beryllium, magnesium, zinc, cadmium and aluminum in which at least all but one of the valencies of the element are satisfied by alkyl groups, the remaining valency, if any, being satisfied by a member selected from the group consisting of halogen and alkyl and alkoxy groups, and recovering the polymerizate thus produced.

2. The process of claim 1, wherein said unsaturated hydrocarbon is propylene.

3. The process of claim 1, wherein the catalyst is prepared by mixing the iron halide with a propyl compound of the element.

4. The process of claim 1, wherein the unsaturated hydrocarbon is propylene and the iron halide is a ferric halide.

5. The process of claim 1, wherein the unsaturated hydrocarbon is propylene and the iron halide is ferric chloride.

6. The process of claim 1, wherein the unsaturated hydrocarbon is propylene and the iron halide is ferrous halide.

7. The process of claim 1, wherein the unsaturated hydrocarbon is propylene and the iron halide is ferrous chloride.

8. A process for the production of linear, regular head-to-tail polymers of propylene which process comprises heating monomeric propylene, at a temperature between 50° C. and 100° C. and a pressure between normal atmospheric pressure and about 30 atmospheres, in contact with a catalyst prepared by mixing an iron halide selected from the group consisting of ferric and ferrous halides with an alkyl compound of an element selected from the group consisting of beryllium, magnesium, zinc, cadmium and aluminum in which at least all but one of the valencies of the element are satisfied by alkyl groups, the remaining valency, if any, being satisfied by a member selected from the group consisting of halogen and alkyl and alkoxy groups, and recovering the polymerizate comprising mixed separable crystalline and amorphous polymers thus produced.

9. A process for the production of linear, regular head-to-tail polymers of propylene which process comprises heating monomeric propylene, at a temperature between 60° C. and 70° C. and a pressure between 10 and 20 atmospheres, in contact with a catalyst prepared by mixing an iron halide selected from the group consisting of ferric and ferrous halides with an alkyl compound of an element selected from the group consisting of beryllium, magnesium, zinc, cadmium and aluminum in which at least all but one of the valencies of the element are satisfied by alkyl groups, the remaining valency, if any, being satisfied by a member selected from the group consisting of halogen and alkyl and alkoxy groups, and recovering the polymerizate comprising mixed, separable crystalline and amorphous polymers thus produced.

10. A process for the production of linear, regular head-to-tail propylene polymers which process comprises heating monomeric propylene, at a temperature between 60° C. and 70° C. and a pressure between 10 and 20 atmospheres, in contact with a catalyst prepared by mixing an iron halide selected from the group consisting of ferric and ferrous halides with an alkyl compound of an element selected from the group consisting of beryllium, magnesium, zinc, cadmium and aluminum in which at least all but one of the valencies of the element are satisfied by alkyl groups, the remaining valency, if any, being satisfied by a member selected from the group consisting of halogen and alkyl and alkoxy groups, in a molar ratio of not more than ten parts of the metal alkyl compound to one part of the iron halide, and recovering the polymerizate comprising mixed, separable crystalline and amorphous polymers thus produced.

11. A process for the production of linear, regular head-to-tail propylene polymers which process comprises heating monomeric propylene, at a temperature between 60° C. and 70° C. and a pressure between 10 and 20 atmospheres, in contact with a catalyst prepared by mixing an iron halide selected from the group consisting of ferric and ferrous halides with an alkyl compound of an element selected from the group consisting of beryllium, magnesium, zinc, cadmium and aluminum in which at least all but one of the valencies of the element are satisfied by alkyl groups, the remaining valency, if any, being satisfied by a member selected from the group consisting of halogen and alkyl and alkoxy groups, in a molar ratio of not more than five parts of the metal alkyl compound to one part of the iron halide, and recovering the polymerizate comprising mixed, separable crystalline and amorphous polymers thus produced.

12. A process for the production of linear, regular, head-to-tail polymers of propylene which comprises heating a mass comprising (a) monomeric propylene and (b) the reaction product of anhydrous ferric chloride and triethyl aluminum at a temperature between 50° C. and 100° C. and a pressure between normal atmospheric pressure and about 30 atmospheres, to thereby effect polymerization of the propylene to a mixture of amorphous and crystalline polymers.

13. A process for the production of linear, regular, head-to-tail polymers of propylene which comprises heating a mass comprising (a) monomeric propylene and (b) the reaction product of anhydrous ferrous chloride and aluminum diethyl monochloride at a temperature between 50° C. and 100° C. and a pressure between normal atmospheric pressure and about 30 atmospheres, to thereby effect polymerization of the propylene to a mixture of amorphous and crystalline polymers.

14. A process for the production of linear, regular, head-to-tail propylene polymers which comprises heating monomeric propylene at a temperature between 50° C. and 100° C. and a pressure between normal atmospheric pressure and 30 atmospheres in the presence of a reaction product of a chlordialkyl aluminum compound and an iron halide to thereby effect polymerization of the propylene to a mixture of amorphous and crystalline polymers.

15. A process for the production of linear, regular head-to-tail propylene polymers which process comprises adding to a liquid mixture of (a) an alkyl compound of an element selected from the group consisting of beryllium, magnesium, zinc, cadmium and aluminum in which at least all but one of the valencies of the element are satisfied by alkyl groups and the remaining valency, if any, is satisfied by a member selected from the group consisting of halogen and alkyl and alkoxy groups, (b) an inert solvent and (c) the propylene to be polymerized, an iron halide selected from the group consisting of ferrous and ferric halides, and subjecting the propylene to polymerizing conditions in contact with the product of reaction between the alkyl compound of the element and the iron halide.

16. A process for the production of linear, regular head-to-tail propylene polymers, which process comprises contacting propylene under polymerization conditions with a catalyst prepared by mixing an alkyl compound of an element selected from the group consisting of beryllium, magnesium, zinc, cadmium and aluminum in which the alkyl groups are propyl groups, with a solid iron compound free of oxidizing anions and selected from the group consisting of ferrous and ferric halides, and recovering the polypropylene thus produced.

References Cited in the file of this patent

UNITED STATES PATENTS 2,843,577    Friedlander et al. _____ July 15, 1958

FOREIGN PATENTS 534,792    Belgium _____ Jan. 31, 1955
538,762    Belgium _____ Dec. 6, 1955

OTHER REFERENCES

Calloway: Chem. Rev. 17, 327, 374–77 (1935).

UNITED STATES PATENT OFFICE

Certificate of Correction

Patent No. 2,882,263

April 14, 1959

Giulio Natta et al.

It is hereby certified that error appears in the printed specification of the above numbered patent requiring correction and that the said Letters Patent should read as corrected below.

Column 1, line 32, after "amorphous" insert —and—; line 43, after "using" insert a comma; line 48, for "compoundts" read —compounds—; line 51, after "elements" strike out the word "of"; same column 1, line 60, for "campounds" read —compounds—; column 5, lines 57 and 58, the formula should appear as shown below instead of as in the patent:

$$C \xrightarrow{\text{limit}} 0 \ \frac{\eta \text{ spec}}{C}$$

column 5, line 59, for "gms./cs." read —gms./cc.—; column 6, line 42, after "and" and before the comma insert —that—; line 44, after "carbon atoms" insert —can be excluded. Among all possible remaining regular successions of $d$ and $l$ asymmetric carbon atoms—; line 45, after "polymer" insert —, it is believed,—; same column 6, same line 45, after "data," insert —that—.

Signed and sealed this 10th day of May 1960.

[SEAL]

Attest:
KARL H. AXLINE,
Attesting Officer.

ROBERT C. WATSON,
Commissioner of Patents.